US012791076B2

(12) United States Patent
Randall et al.

(10) Patent No.: US 12,791,076 B2
(45) Date of Patent: Nov. 10, 2026

(54) BEARING HOUSING POSITION SENSOR

(71) Applicant: Fox Factory, Inc., Duluth, GA (US)

(72) Inventors: Connor Randall, Poncha Springs, CO (US); Camden Gillis, Salida, CO (US)

(73) Assignee: Fox Factory, INC., Duluth, GA (US)

( * ) Notice: Subject to any disclaimer, the term of this patent is extended or adjusted under 35 U.S.C. 154(b) by 389 days.

(21) Appl. No.: 18/532,368

(22) Filed: Dec. 7, 2023

(65) Prior Publication Data

US 2025/0188993 A1 Jun. 12, 2025

(51) Int. Cl.
*F16F 9/32* (2006.01)

(52) U.S. Cl.
CPC .... *F16F 9/3292* (2013.01); *F16F 2230/0047* (2013.01); *F16F 2230/08* (2013.01)

(58) Field of Classification Search
CPC .. F16F 9/3292; F16F 2230/08; F16F 2232/08; F16F 2230/0047; F15B 15/28; F15B 15/2815; F15B 15/2823; F15B 15/2853; F15B 15/2892
See application file for complete search history.

(56) References Cited

U.S. PATENT DOCUMENTS

| | | | | |
|---|---|---|---|---|
| 3,688,410 | A * | 9/1972 | Zeidler | G01D 5/34738 33/773 |
| 2015/0247514 | A1* | 9/2015 | Isobe | F15B 15/2815 92/5 R |
| 2020/0340545 | A1* | 10/2020 | Strickland | F16F 9/3488 |

FOREIGN PATENT DOCUMENTS

| | | | | |
|---|---|---|---|---|
| CN | 102705301 | A * | 10/2012 | |
| DE | 3119829 | A1 * | 12/1982 | |
| DE | 19914459 | A1 * | 10/1999 | F15B 15/2815 |
| FR | 2506404 | A1 * | 11/1982 | F15B 15/2892 |
| KR | 20170139712 | A * | 12/2017 | G01B 5/30 |

* cited by examiner

*Primary Examiner* — James J Taylor, II
(74) *Attorney, Agent, or Firm* — Schmeiser Olsen

(57) ABSTRACT

A position sensor mounted within a bearing housing assembly of a shock assembly is provided. A shaft extends through the bearing housing assembly. The position sensor includes a wheel assembly engaging the reciprocating shaft and measures the travel of the shaft.

7 Claims, 10 Drawing Sheets

BEARING HOUSING POSITION SENSOR

BACKGROUND OF THE INVENTION

Technical Field

This invention relates generally to a position sensor in a bearing housing assembly of a shock assembly.

State of the Art

Most semi-active suspension systems benefit from shock position sensor technology for feedback utilized in control algorithms. However, it is difficult to integrate a position sensor into the shock for many reasons, such as additional dead length requirements, integration with coil springs, compatibility with steel shock bodies, etc. Due to these complexities, the position sensor is generally not integrated into the shock assembly, instead requiring additional sensors on the suspension, such as rotary potentiometers acting on A-arms to calculate shock stroke. In certain cases, such as with leaf spring suspensions, this is very difficult to do. Due to complexity and cost, often a central initial measurement unit (IMU) is used, resulting in a tradeoff in performance compared to a control system that has shock position feedback.

Accordingly, there is a need for directly integrating a position sensor in the bearing housing assembly of a shock assembly.

SUMMARY OF THE INVENTION

An embodiment includes a bearing housing position sensor assembly, wherein the bearing housing position sensor assembly comprises: a bearing housing assembly; a bearing housing position sensor provided within the bearing housing assembly; a shaft member mounted for movement within the bearing housing assembly; and at least one rotary member, wherein the at least one rotary member is engaged with the shaft member and operatively coupled with the bearing housing position sensor.

The bearing housing assembly may be provided with at first enlarged rectangular recessed portion which receives a first slidable block member therein. The bearing housing position sensor may be mounted within the first slidable block member, and wherein the bearing housing position sensor may be positioned to operatively couple to the at least one rotary member. A first extendable coil spring member may be positioned within the first enlarged rectangular recessed portion of the bearing housing assembly, and wherein the first extendable coil spring member may be connected between the bearing housing assembly and the first slidable block member. A second enlarged rectangular recessed portion may be provided in the bearing housing assembly, and a second slidable block member may be positioned within the second enlarged rectangular recessed portion, and wherein the second slidable block member may be operatively coupled to the at least one rotary member.

A second extendable coil spring member may be positioned within the second enlarged rectangular recessed portion of the bearing housing assembly, and wherein the second extendable coil spring member may be connected between the bearing housing assembly and the second slidable block member. The bearing housing position sensor may be provided with a rotary encoder disc member secured to a position sensor housing, wherein the position sensor housing having the rotary encoder disc member may be mounted within the first slidable block member, and wherein the rotary encoder disc member may be operatively coupled to the at least one rotary member. The at least one rotary member may be fixedly mounted to an elongate shaft member, and wherein the elongate shaft member may be supported by both the first and second slidable block members.

An embodiment includes a shock assembly having a bearing housing position sensor, the shock assembly comprising: a cylinder housing; a bearing housing assembly, wherein the bearing housing assembly is secured to the cylinder housing; a bearing housing position sensor provided within the bearing housing assembly; a shaft member mounted for movement within the cylinder housing and the bearing housing assembly; and at least one rotary member, wherein the at least one rotary member is biased toward and engaged with the shaft member and operatively coupled with the bearing housing position sensor.

The bearing housing assembly may be provided with a first enlarged rectangular recessed portion which receives a first slidable block member therein. The bearing housing position sensor may be mounted within the first slidable block member, and wherein the bearing housing position sensor may be positioned to operatively couple to the at least one rotary member. A first extendable coil spring member may be positioned within the first enlarged rectangular recessed portion of the bearing housing assembly, and wherein the first extendable coil spring member may be connected between the bearing housing assembly and the first slidable block member. A second enlarged rectangular recessed portion may be provided in the bearing housing assembly, and wherein a second slidable block member may be positioned within the second enlarged rectangular recessed portion and operatively coupled to the at least one rotary member. A second extendable coil spring member may be positioned within the second enlarged rectangular recessed portion of the bearing housing assembly, and wherein the second extendable coil spring member may be connected between the bearing housing assembly and the second slidable block member.

The bearing housing position sensor may be provided with a rotary encoder disc member secured to a position sensor housing, wherein the position sensor housing having the rotary encoder disc member may be mounted within the first slidable block member, and wherein the rotary encoder disc member may be operatively coupled to the at least one rotary member. The at least one rotary member may be fixedly mounted to an elongate shaft member, and the elongate shaft member may be supported by both the first and second slidable block members.

Another embodiment includes a method of using a shock assembly having a bearing housing position sensor, the method comprising: providing a cylinder housing; securing a bearing housing assembly to the cylinder housing; locating a bearing housing position sensor within the bearing housing assembly; mounting a shaft member for movement within the cylinder housing and the bearing housing assembly; engaging at least one rotary member with the shaft member and operatively coupling the at least one rotary member to the bearing housing position sensor; and measuring the movement of the shaft member with the bearing housing position sensor.

The method may further comprise providing the bearing housing assembly with at least one enlarged rectangular recessed portion and positioning a slidable block member therein. The method may further comprise mounting the bearing housing position sensor within the slidable block member and positioning the bearing housing position sensor to operatively couple to the at least one rotary member. The method may further comprise biasing the at least one rotary member toward the shaft member, which may include positioning an extendable coil spring member within the at least one enlarged rectangular recessed portion of the bearing housing assembly and connecting the extendable coil spring member between the bearing housing assembly and the slidable block member.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

As discussed above, embodiments of the present invention relate to a bearing housing assembly having a position sensor.

Figure 1:
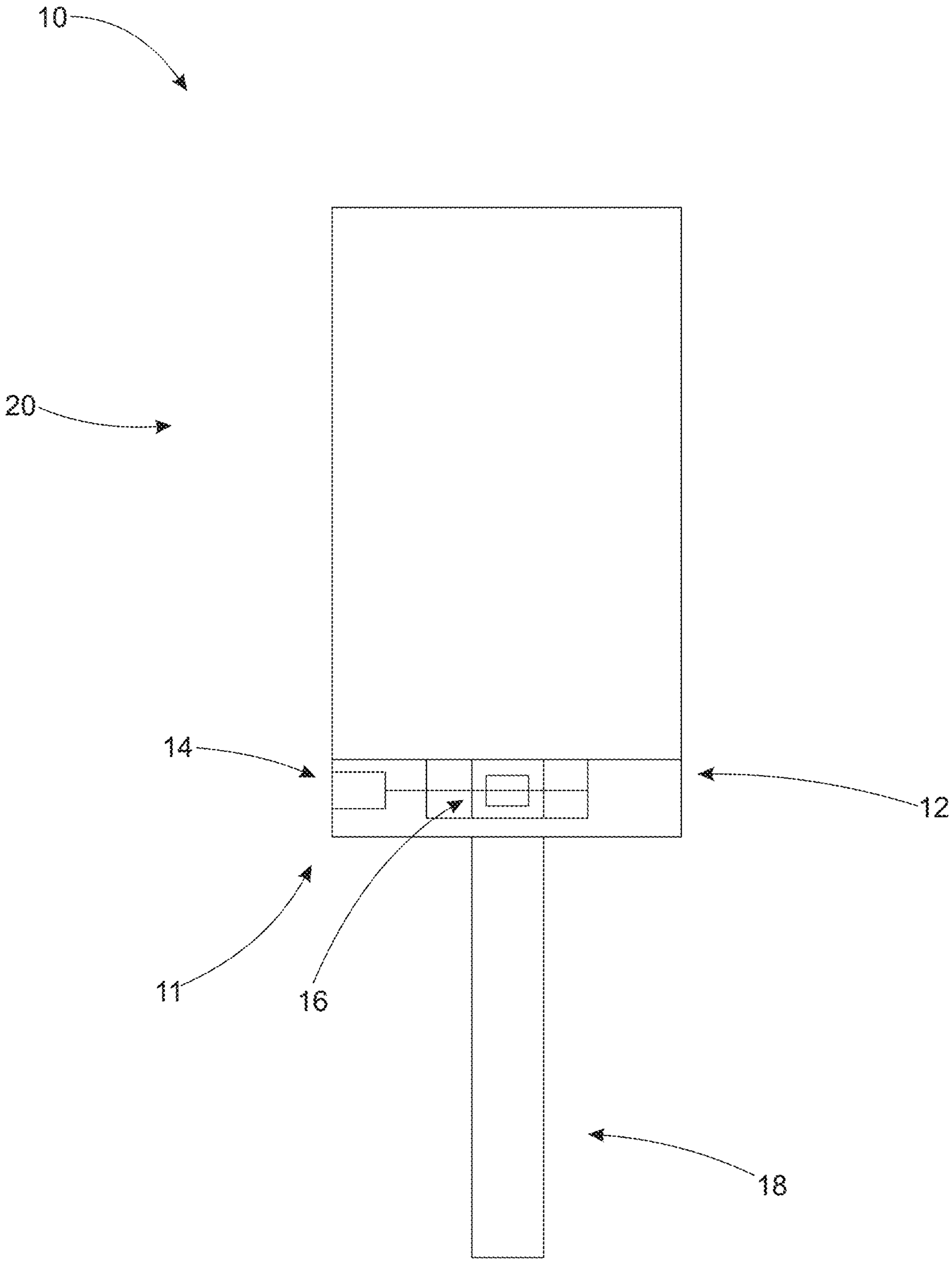
FIG. 1 is a schematical view of a bearing housing position sensor according to an embodiment.

An embodiment of a shock assembly 10 having bearing housing position sensor assembly 11 is depicted in FIGS. 1-6. In FIG. 1, bearing housing position sensor assembly 11 comprises a bearing housing assembly 12 and a bearing housing position sensor 14 positioned within bearing housing assembly 12. Bearing housing position sensor 14 includes a wheel assembly 16 engaging a shaft member 18 along an outer surface thereof. Bearing housing assembly 12 comprises a bearing housing, seals and bearing cap, wherein the bearing housing assembly 12 is mounted to a lower portion of a cylinder housing 20. The bearing housing position sensor 14 coupled within the bearing housing assembly 12 may be coupled within the bearing housing, the bearing cap or a space between the bearing housing and the bearing cap.

Figure 2:
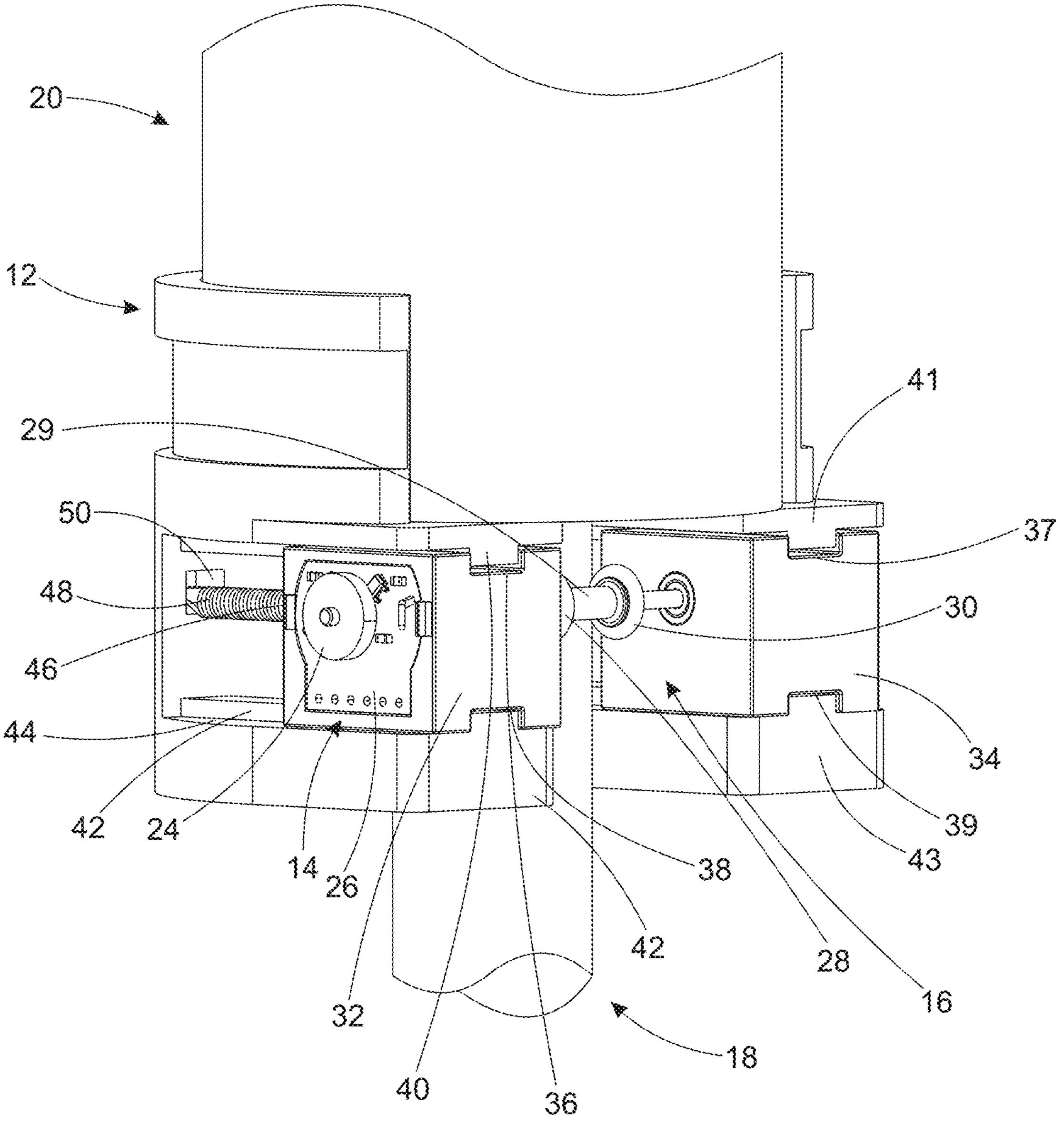
FIG. 2 is a partial perspective view of a bearing housing position sensor according to an embodiment.
Figure 3:
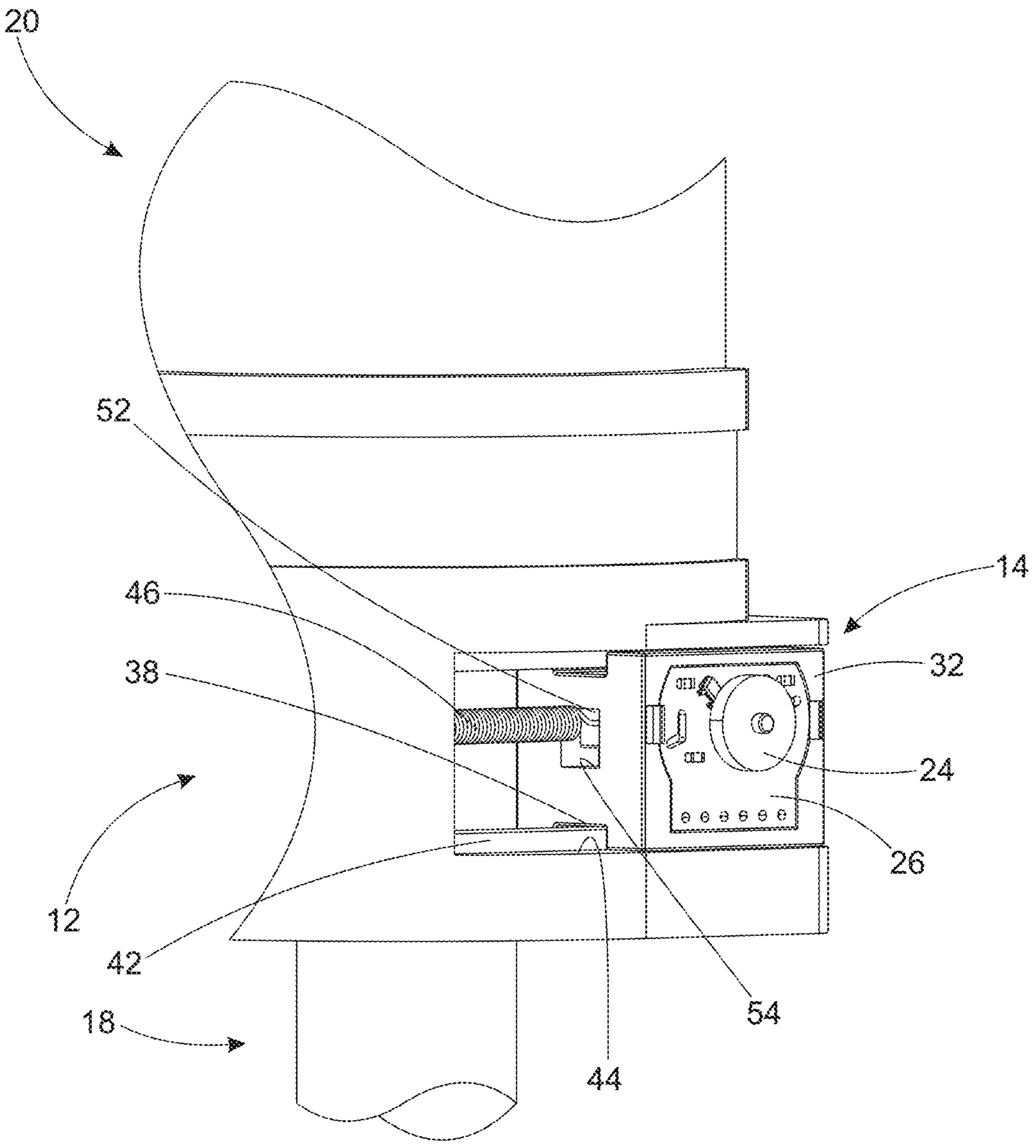
FIG. 3 is a partial perspective view of a bearing housing position sensor according to an embodiment.
Figure 4:
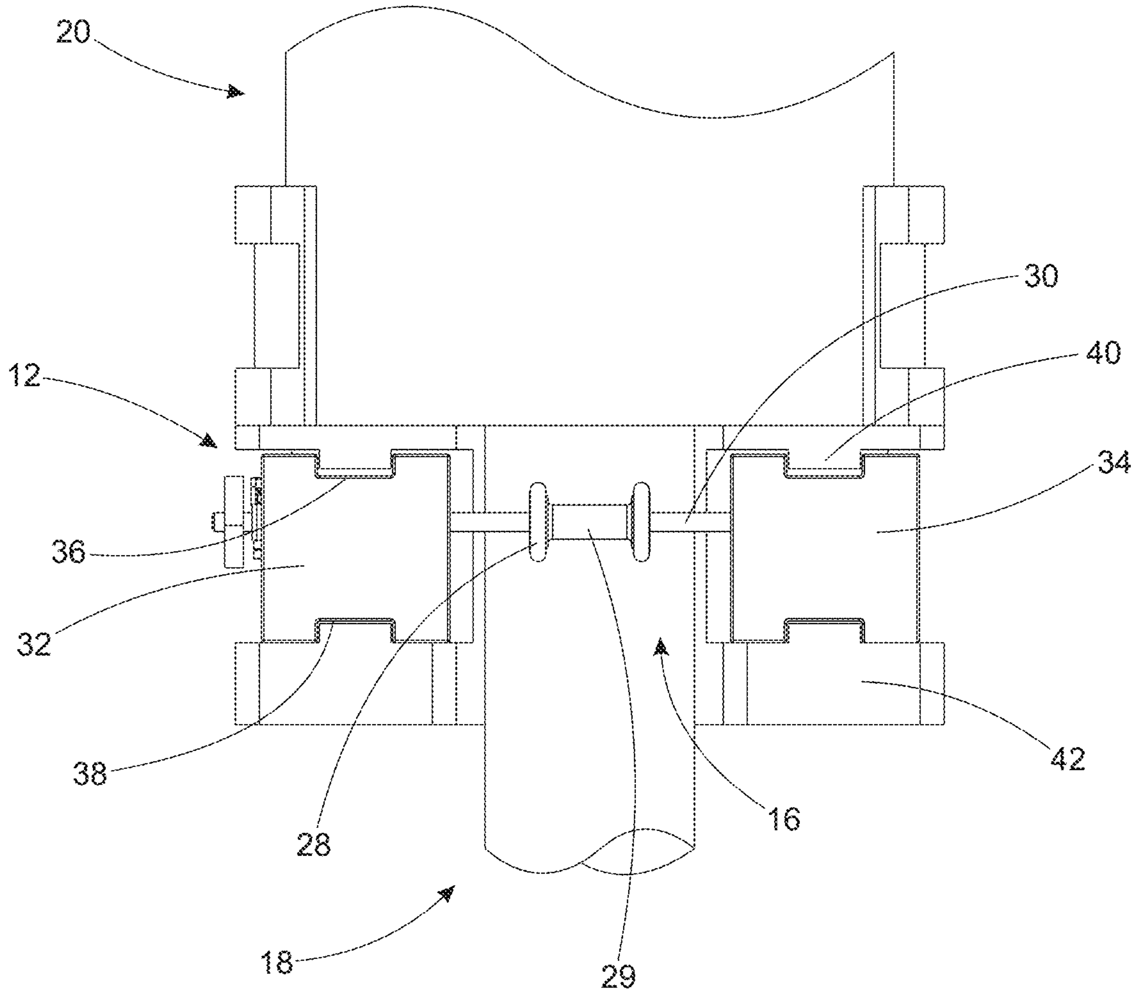
FIG. 4 is a front plan view of a bearing housing position sensor according to an embodiment.

In FIGS. 2 and 4, bearing housing position sensor 14 is provided with a rotary encoder disc member 24 mounted adjacent a position sensor housing 26. Wheel assembly 16 comprises at least one rotary member 28, and as shown in FIGS. 2 and 4, a pair of rotary members 28 mounted to an elongate tubular member 29 which is secured to an elongate shaft member 30. O-rings (not shown) may be provided on the pair of rotary members 28. The elongate shaft member 30 is operatively coupled to the rotary encoder disc member 24. When shaft member 18 is actuated, the pair of rotary members 28 are rotated to drive elongate shaft member 30 which rotates rotary encoder disc member 24. In embodiments depicted in FIGS. 1-10, the shaft member 18 depicted is a reciprocating shaft member, wherein the at least one rotary member 28 is rotated as the reciprocating shaft member 18 is actuated in a reciprocating manner and the rotary members 28 rotate in an axial direction of the shaft member 18. In other embodiments, the shaft member 18 may be a rotating shaft member, wherein the at least one rotary member 28 engages the shaft member 18 in a direction perpendicular to the embodiments shown in FIGS. 1-10. In this configuration, the actuation of the rotating shaft member 18 rotates the at least one rotary member 28 in a radial direction of the shaft member 18.

Rotary encoder disc member 24 is used to determine shock position. Based on diameter of the wheel assembly 16 and resolution of the rotary encoder disc member 24, the shock position can be calculated to a certain accuracy. Wheel assembly 16 contacts the shaft member 18 and spins as the shock goes through its travel. The spinning wheel assembly 16 is operatively coupled to rotary encoder disc member 24 via elongate shaft member 30 which determines the exact shock travel.

Elongate shaft member 30 is mounted within a first slidable block member 32 and a second slidable block member 34. Both first and second slidable block members 32, 34 may each be provided with upper recessed linear track portions 36, 37 and lower recessed linear track portions 38, 39. The upper and lower recessed linear track portions 36, 37 and 38, 39 are respectively slidably mounted on upper protruded linear track portions 40, 41 and lower protruded linear track portions 42, 43 provided in both a first enlarged rectangular recessed portion 44 and a second enlarged rectangular recessed portion 45 of the bearing housing assembly 12 (See FIG. 5).

Figure 5:
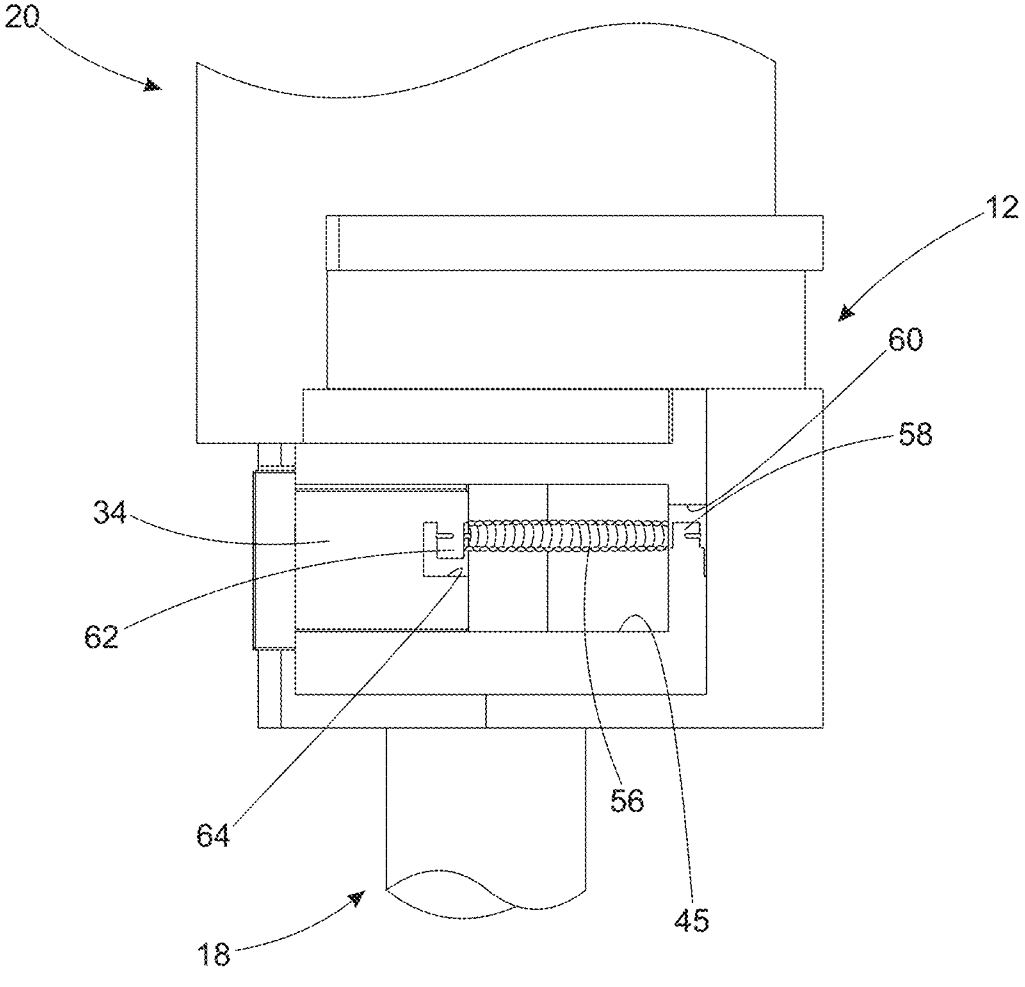
FIG. 5 is a partial sectional plan side view of a bearing housing position sensor according to an embodiment.

Referring to FIGS. 2 and 3 a first extendable coil spring member 46 is secured at one end to a first cylindrical post member 48 provided in a first square shaped recessed portion 50 of bearing housing assembly 12. An opposite end of first extendable coil spring member 46 is secured to a second cylindrical post member 52 provided in a second square shaped recessed portion 54 provided in first slidable block member 32. Additionally, FIG. 5 shows a second extendable coil spring member 56 is secured at one end to a third cylindrical post member 58 provided in a third square shaped recessed portion 60 of bearing housing assembly 12. An opposite end of second extendable coil spring member 56 is a secured to a fourth cylindrical post member 62 provided in a fourth square shaped recessed portion 64 of second slidable block member 34. The first and second extendable coil spring members 46 and 56 operate to bias the at least one rotary member 28 against the shaft member 18. While coil spring members are disclosed, it is understood that other biasing members may be utilized to bias the at least one rotary member 28 against the shaft member 18.

While FIGS. 2, 3 and 5 depict coil springs that operate to bias the at least one rotary member 28 against the shaft member 18, other means of biasing the at least one rotary member 28 against the shaft member 18 may be utilized. For example, the at least one rotary member 28 may include compliance within the rotary member 28 itself, a spring-loaded sliding member, and the like. Further, other forms of maintaining contact are contemplated, such as, but not limited to elastic deformation in the shaft member.

FIGS. 1-5 depict an embodiment where a pair of rotary members 28 mounted to an elongate tubular member 29 is utilized. This allows the rotary members 28 to contact at least two parts of the shaft member 18 and increase frictional coupling between the rotary members 28 and the shaft member 18 to reduce slipping.

Figure 8:
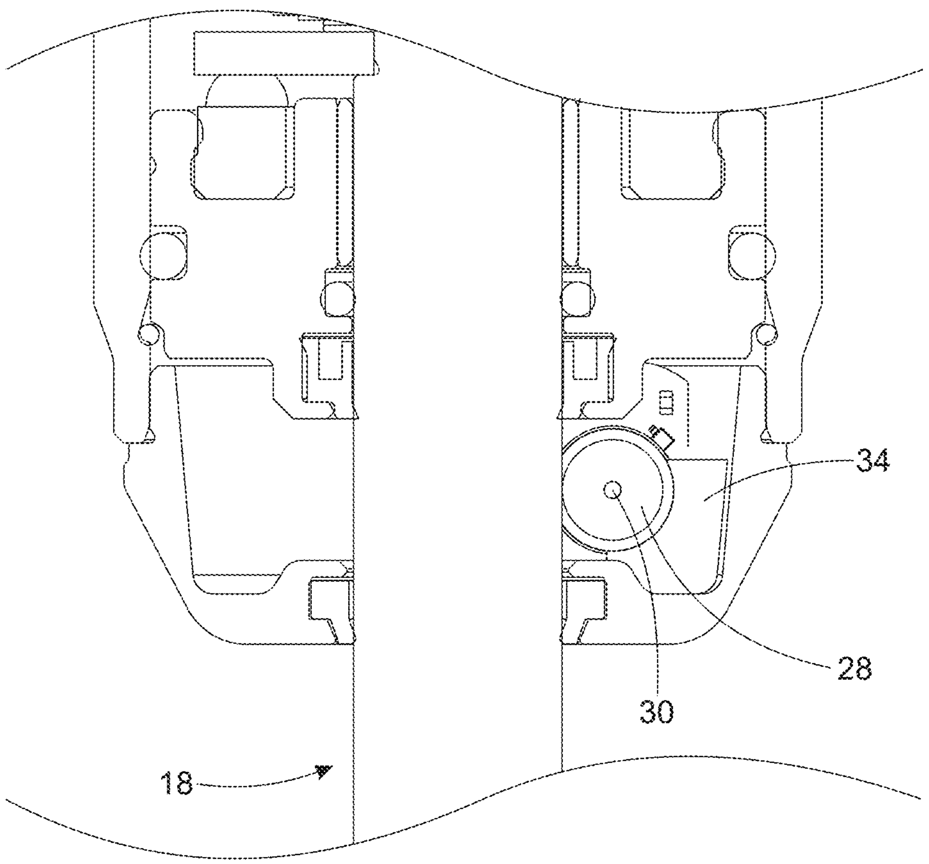
FIG. 8 is a partial sectional plan side view of a bearing housing position sensor according to an embodiment.
Figure 9:
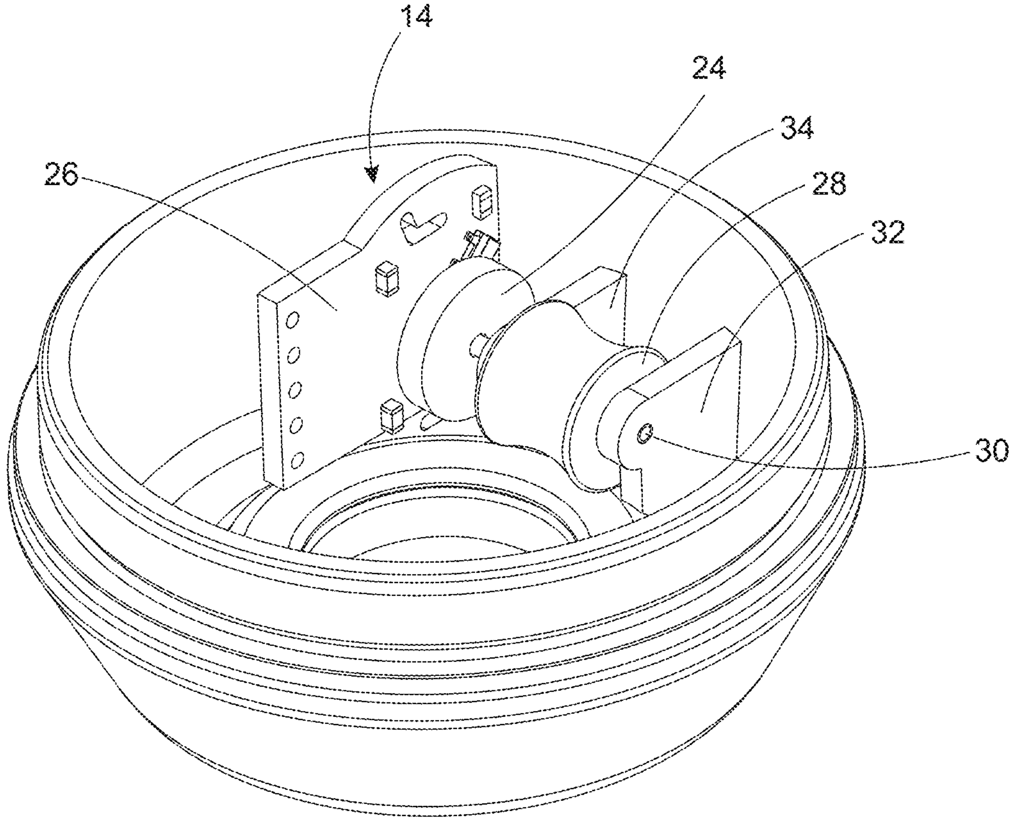
FIG. 9 is a partial perspective view of a bearing housing position sensor according to an embodiment.
Figure 10:
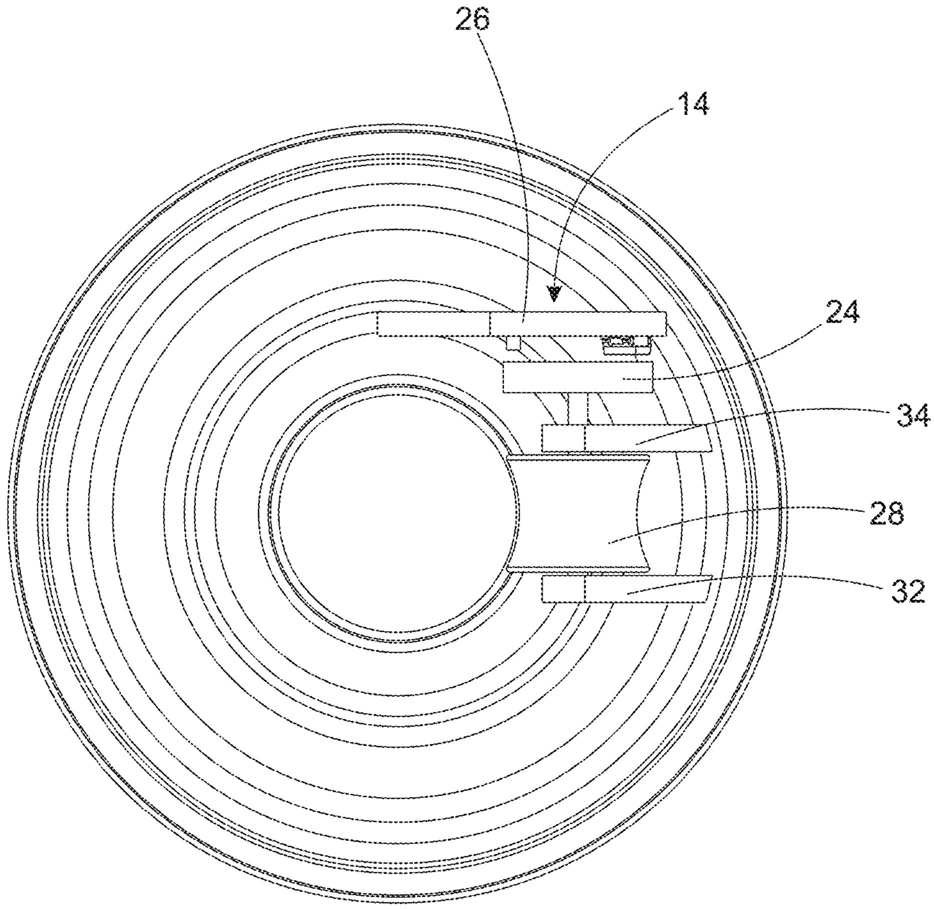
FIG. 10 is a top view of a bearing housing position sensor according to an embodiment.

While FIGS. 1-5 depict a pair of rotary members 28, FIGS. 8-10 depict a single rotary member 28 having a channel in the rotary member 28 that corresponds to a circumference of the shaft member 18. In other words, the radius of the shaft member 18 is substantially similar to a radius of the channel of the rotary member 28. This allows for contact between the rotary member 28 and the shaft member 18 along the entire width of the rotary member 28. As with the two rotary members 28 shown in FIGS. 1-5, the shape of the rotary member 28 in FIGS. 8-10 increases friction between the rotary member 28 and the shaft member 18 to reducing slipping.

Other components shown in FIGS. 8-10 includes a bearing housing position sensor 14 that is provided with a rotary encoder disc member 24 mounted adjacent a position sensor housing 26 and operates as described above. The rotary member 28 is coupled to an elongate shaft member 30, which is mounted within a first slidable block member 32 and a second slidable block member 34. The slidable block members 32 and 34 are biased to bias the rotary member 28 against the shaft member 18. The functionality is the same as the bearing housing position sensor assembly 11 depicted in FIGS. 1-5 and described above.

Figure 6:
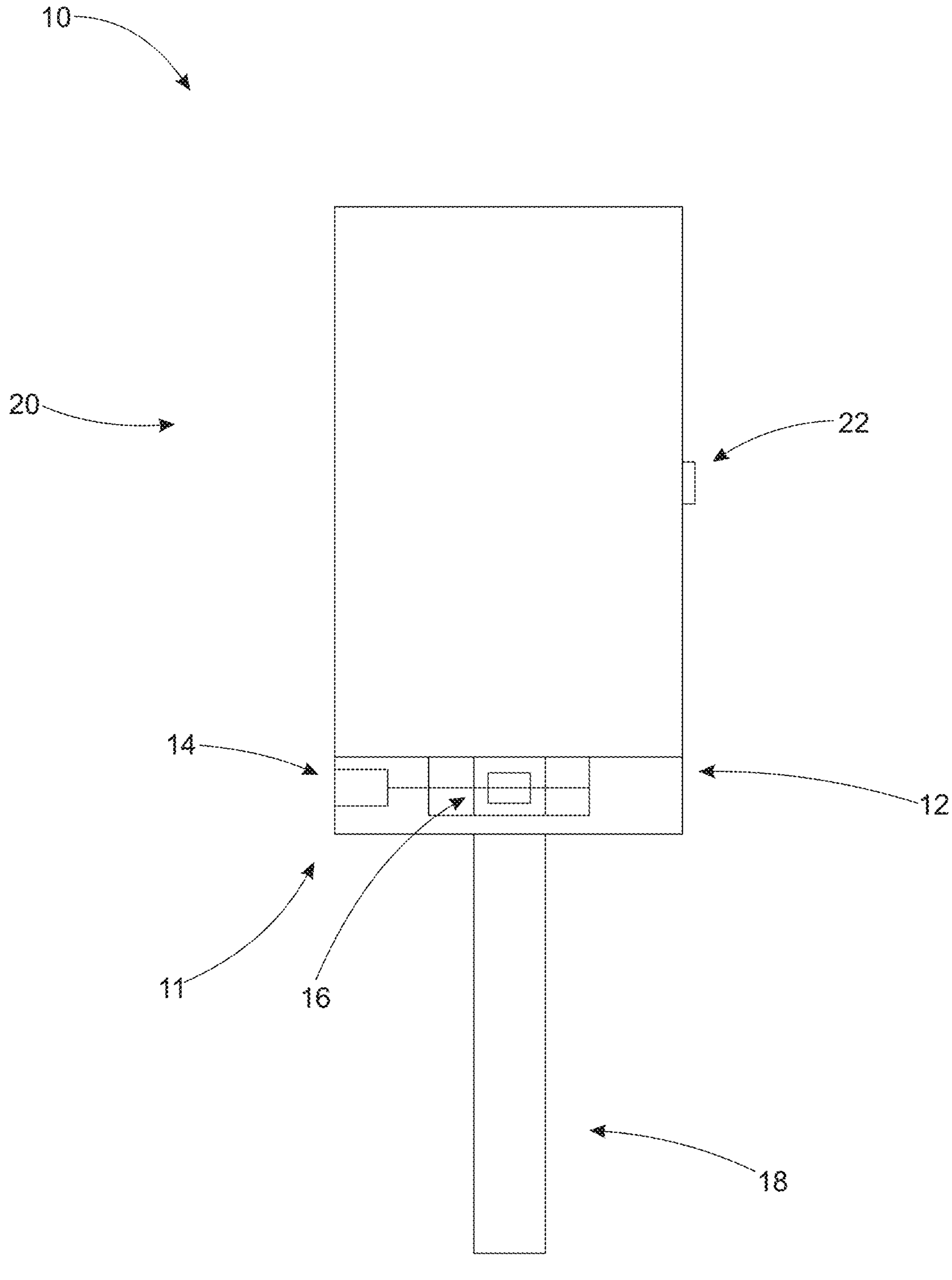
FIG. 6 is a schematical view of a bearing housing position sensor according to an embodiment.

In an embodiment, as shown in FIG. 6, a reset sensor 22 is provided on the outer surface of cylinder housing 20 in a ride zone of a shock. Reset sensor 22, such as a Hall effect sensor, may be used to reset bearing housing position sensor 14 to a known position in case bearing housing position sensor 14 slips or loses count.

Figure 7:
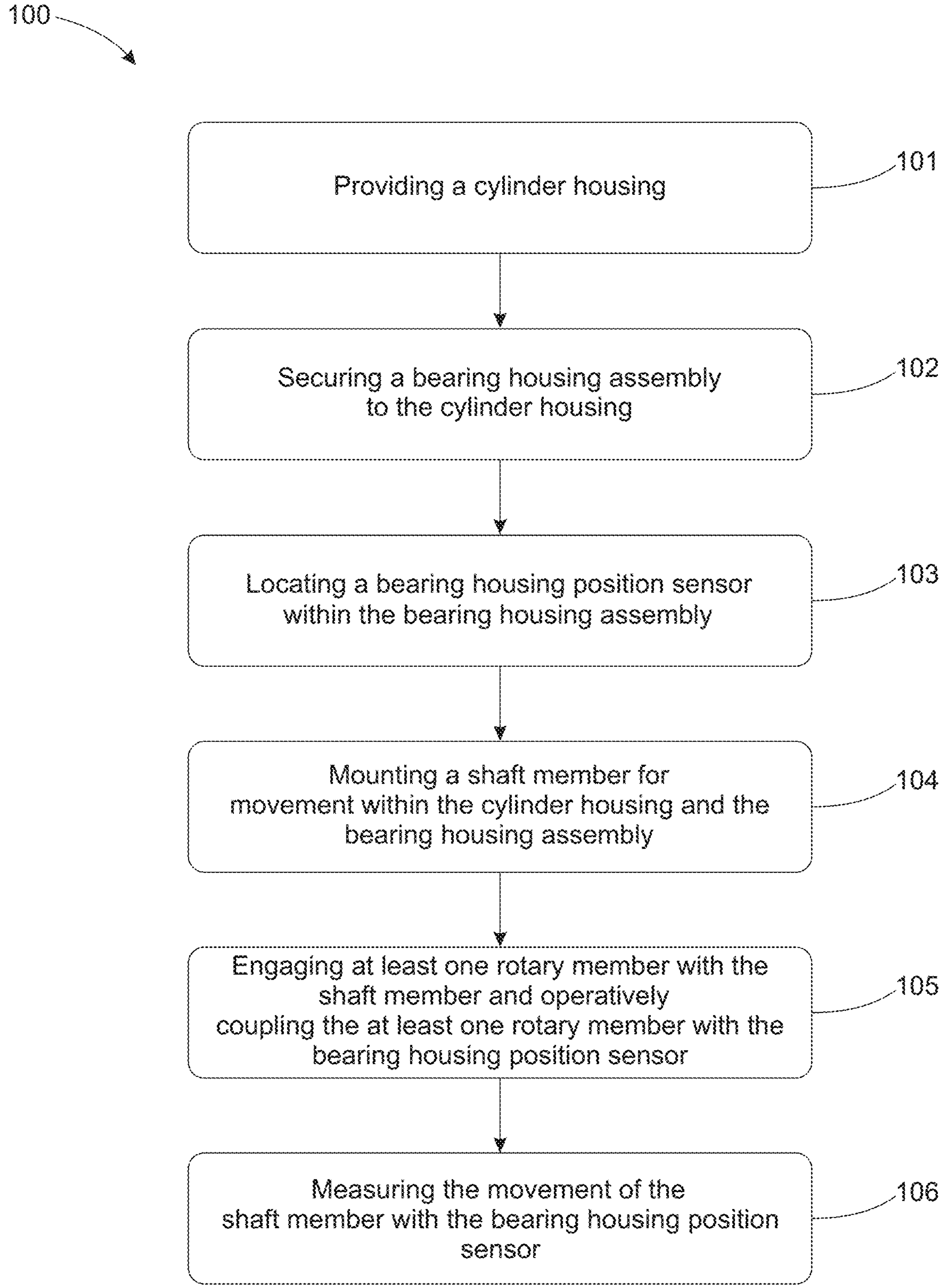
FIG. 7 is a flow chart depicting a method of using a bearing housing position sensor according to an embodiment.

Referring to FIG. 7, an embodiment includes a method 100 of using a bearing housing position sensor is shown. The method 100 comprises providing a cylinder housing (Step 101); securing a bearing housing assembly to the cylinder housing (Step 102); locating a bearing housing position sensor within the bearing housing assembly (Step 103); mounting a shaft member for movement within the cylinder housing and the bearing housing assembly (Step 104); engaging at least one rotary member with the shaft member and operatively coupling the at least one rotary member with the bearing housing position sensor (Step 105); and measuring the movement of the shaft member with the bearing housing position sensor (Step 106).

The method 100 may further comprise providing the bearing housing assembly with at least one enlarged rectangular recessed portion and positioning a slidable block member therein. The method 100 may also comprise mounting the bearing housing position sensor within the slidable block member and positioning the bearing housing position sensor to operatively couple with the at least one rotary member. Additionally, the method 100 may comprise biasing the at least one rotary member toward the shaft member, which may include positioning an extendable coil spring member within the at least one enlarged rectangular recessed portion of the bearing housing assembly and connecting the extendable coil spring member between the bearing housing assembly and the slidable block member.

In an embodiment, an additional sensor may be incorporated as a zero point at a known displacement to ensure the rotary encoder disc member 24 is tracking position correctly. In some cases, such as very high-speed hits or bumps, there is a risk of losing counts with the rotary encoder disc member 24 causing drift in the measurement.

In an embodiment, a geared system may be used to provide absolute position. Gearing may be used to reduce an output rotation of the wheel assembly 16 to implement an absolute position of rotary encoder disc member 24 vs. tracking the rotations.

In an embodiment, a position sensor may be used to measure the position of a shaft guard on the shock. A wheel may face the outside of a shaft and run along the inside of a shaft guard as the shock goes through its travel.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A bearing housing position sensor assembly, wherein the bearing housing position sensor assembly comprises:
- a bearing housing assembly;
- a bearing housing position sensor provided within the bearing housing assembly;
- a shaft member mounted for movement within the bearing housing assembly; and
- at least one rotary member, wherein the at least one rotary member is engaged with the shaft member and operatively coupled with the bearing housing position sensor, wherein the at least one rotary member is biased toward the shaft member to maintain contact between the at least one rotary member and the shaft member, wherein the bearing housing assembly is provided with a first enlarged rectangular recessed portion which receives a first slidable block member therein, wherein the bearing housing position sensor is mounted within the first slidable block member and operatively coupled to the at least one rotary member, wherein a first extendable coil spring member is positioned within the first enlarged rectangular recessed portion of the bearing housing assembly and connected between the bearing housing assembly and the first slidable block member, wherein a second enlarged rectangular recessed portion is provided in the bearing housing assembly, and wherein a second slidable block member is positioned within the second enlarged rectangular recessed portion and operatively coupled to the at least one rotary member.

2. The bearing housing position sensor assembly of claim 1, wherein a second extendable coil spring member is positioned within the second enlarged rectangular recessed portion of the bearing housing assembly, and wherein the second extendable coil spring member is connected between the bearing housing assembly and the second slidable block member.

3. The bearing housing position sensor assembly of claim 1, wherein the bearing housing position sensor is provided with a rotary encoder disc member secured to a position sensor housing, wherein the position sensor housing having the rotary encoder disc member is mounted within the first slidable block member, and wherein the rotary encoder disc member is operatively coupled to the at least one rotary member.

4. A shock assembly having a bearing housing position sensor, the shock assembly comprising:

a cylinder housing;

a bearing housing assembly, wherein the bearing housing assembly is secured to the cylinder housing, wherein the bearing housing position sensor provided within the bearing housing assembly;

a shaft member mounted for movement within the cylinder housing and the bearing housing assembly; and at least one rotary member, wherein the at least one rotary member is biased toward and engaged with the shaft member to maintain contact therebetween and operatively coupled with the bearing housing position sensor, wherein the bearing housing assembly is provided with a first enlarged rectangular recessed portion which receives a first slidable block member therein, wherein the bearing housing position sensor is mounted within the first slidable block member and operatively coupled to the at least one rotary member, wherein a first extendable coil spring member is positioned within the first enlarged rectangular recessed portion of the bearing housing assembly and connected between the bearing housing assembly and the first slidable block member, wherein a second enlarged rectangular recessed portion is provided in the bearing housing assembly, and wherein a second slidable block member is positioned within the second enlarged rectangular recessed portion and operatively coupled to the at least one rotary member.

5. The shock assembly of claim 4, wherein a second extendable coil spring member is positioned within the second enlarged rectangular recessed portion of the bearing housing assembly, and wherein the second extendable coil spring member is connected between the bearing housing assembly and the second slidable block member.

6. The shock assembly of claim 4, wherein the bearing housing position sensor is provided with a rotary encoder disc member secured to a position sensor housing, wherein the position sensor housing having the rotary encoder disc member is mounted within the first slidable block member, and wherein the rotary encoder disc member is operatively coupled to the at least one rotary member.

7. A method of using a shock assembly having a bearing housing position sensor, the method comprising:

providing a cylinder housing;

securing a bearing housing assembly to the cylinder housing;

locating the bearing housing position sensor within the bearing housing assembly;

mounting a shaft member for movement within the cylinder housing and the bearing housing assembly;

engaging at least one rotary member with the shaft member and operatively coupling the at least one rotary member to the bearing housing position sensor, wherein the at least one rotary member is biased toward and engaged with the shaft member to maintain contact therebetween, wherein the bearing housing assembly is provided with a first enlarged rectangular recessed portion which receives a first slidable block member therein, wherein the bearing housing position sensor is mounted within the first slidable block member and operatively coupled to the at least one rotary member, wherein a first extendable coil spring member is positioned within the first enlarged rectangular recessed portion of the bearing housing assembly and connected between the bearing housing assembly and the first slidable block member, wherein a second enlarged rectangular recessed portion is provided in the bearing housing assembly, and wherein a second slidable block member is positioned within the second enlarged rectangular recessed portion and operatively coupled to the at least one rotary member; and measuring the movement of the shaft member with the bearing housing position sensor.

* * * * *